United States Patent [19]

Mazanek et al.

[11] Patent Number: 5,266,622

[45] Date of Patent: Nov. 30, 1993

[54] AQUEOUS DISPERSIONS CONTAINING A SYNERGISTIC DISPERSANT COMBINATION

[75] Inventors: Jan Mazanek, Cologne; Ulrich von Gizycki, Leverkusen; Günter Link, Goslar, all of Fed. Rep. of Germany

[73] Assignee: Bayer Aktiengesellschaft, Leverkusen, Fed. Rep. of Germany

[21] Appl. No.: 970,524

[22] Filed: Nov. 2, 1992

Related U.S. Application Data

[63] Continuation of Ser. No. 725,958, Jun. 27, 1991, which is a continuation of Ser. No. 519,703, May 5, 1990, abandoned, which is a continuation of Ser. No. 347,360, May 4, 1989, abandoned.

[30] Foreign Application Priority Data

May 5, 1988 [DE] Fed. Rep. of Germany ....... 3815239

[51] Int. Cl.$^5$ .............................................. C08K 5/51
[52] U.S. Cl. .................................. 524/131; 524/136; 524/139; 524/599; 524/600
[58] Field of Search ............... 524/136, 137, 139, 599, 524/600, 131; 525/193

[56] References Cited

U.S. PATENT DOCUMENTS

| | | |
|---|---|---|
| 3,156,574 | 11/1964 | Gomm . |
| 4,056,402 | 11/1977 | Guzi, Jr. . |
| 4,502,863 | 3/1985 | Bornaisch et al. ........................ 8/524 |
| 4,590,129 | 5/1986 | Kaschic et al. ........................ 428/473 |
| 4,753,972 | 6/1988 | Kavichandian ........................ 524/131 |
| 4,824,886 | 4/1989 | Schmidt et al. ........................ 524/131 |

FOREIGN PATENT DOCUMENTS

| | | |
|---|---|---|
| 0260945 | 3/1988 | European Pat. Off. . |
| 0325852 | 8/1989 | European Pat. Off. . |
| 3605800 | 8/1987 | Fed. Rep. of Germany . |
| 2019822 | 1/1979 | United Kingdom . |

*Primary Examiner*—Joseph L. Schofer
*Assistant Examiner*—Jeffrey T. Smith
*Attorney, Agent, or Firm*—Sprung, Horn Kramer & Woods

[57] ABSTRACT

Aqueous dispersions of fillers and/or pigments contain a dispersant combination of the following composition:

A) 40 to 95 by weight of a water-soluble polymer,
B) 0 to 60 by weight of a non-ionic alkylene oxide adduct having an average molecular weight of 200 to 100,000,
C) 0 to 60% by weight of compounds of the formulae (I), (II) and/or (III)

$$R_1(\!-\!SO_3X)_z \qquad (I)$$

$$R_1(\!-\!O\!-\!SO_3X)_z \qquad (II)$$

$$R_1(\!-\!O\!-\!PO_3X_2)_z, \qquad (III)$$

in which $R_1$ represents an optionally substituted aliphatic, aromatic or araliphatic radical having 1 to 50 C atoms,
z in each case independently of one another represents an integer from 1 to 10 and
x represents hydrogen, a monovalent metal ion or an optionally substituted ammonium ion and D) 0 to 60% by weight of a compound of the formula (IV)

$$\begin{array}{c} R_2 \\ | \\ Q\!-\!C\!-\!COOR_3 \\ | \\ CH\!-\!COOR_3 \\ | \\ R_2 \end{array} \qquad (IV)$$

in which
Q represents hydrogen, $$YO\!-\!\overset{O}{\underset{OY}{\overset{\|}{P}}}\!-\! \quad \text{or} \quad YO\!-\!\overset{O}{\underset{O}{\overset{\|}{S}}}\!-\!,$$

in which
Y in each case independently of one another represents hydrogen, a monovalent metal ion or an optionally substituted ammonium ion,
$R_2$ in each case independently of one another represents (Abstract continued on next page.)

hydrogen, an optionally substituted alkyl radical having 1 to 12 C atoms or a radical of the type —CH$_2$—COOR$_3$ or —CH$_2$CH$_2$COOR$_3$ and R$_3$ in each case independently of one another represents hydrogen, Y or an optionally substituted alkyl radical having 1 to 25 C atoms, where the sum A) +B) +C) +D) gives 100% by weight and at least one of the components B), C) and D) is different from zero.

8 Claims, No Drawings

AQUEOUS DISPERSIONS CONTAINING A SYNERGISTIC DISPERSANT COMBINATION

This application is a continuation, of application Ser. No. 725,958, filed Jun. 27, 1991, now pending, which is a continuation of application Ser. No. 519,703, filed May 5, 1990, now abandoned, which is a continuation of application Ser. No. 347,360, filed May 4, 1989, now abandoned.

The present invention relates to aqueous dispersions of fillers and/or pigments which contain a synergistic dispersant combination.

Aqueous dispersions, of fillers and/or pigments, which can be used, for example, as paper coating compounds, in general have a solids content in the range from 30 to 85% by weight. The dispersants employed are essentially intended to confer suitable rheological properties on the dispersion with the desired solids content. The dispersd ants are additionally intended to improve the wetting of the substances to be dispersed, to facilitate disagglomeration in the dispersion process and to stabilize the finished dispersion against agglomeration and sedimentation.

Organic and inorganic dispersants are known for these purposes. Inorganic dispersants employed are, for example, phosphates and polyphosphates, such as sodium hexametaphosphate. They show a good dispersant effect, but have the disadvantage that they are not stable to hydrolysis. This means that such dispersions thicken in an undesired manner on relatively long storage.

Organic dispersants employed are, for example, polymers and copolymers of methacrylic and acrylic acid having low to medium molecular weight. Thus, DE-OS (German Published Specification) 2,700,444 describes the use of copolymers with maleic acid, derivatives, JP-OS (Japanese Published Specification) 57/095,395 describes the use of copolymers of acrylic acid and styrenesulphonic acid, JP-OS (Japanese Published Specification) 56/115,630 describes the use of copolymers containing unsaturated sulphonic acids and DE-OS (German Published Specification) 3,101,939 describes the use of phosphorus-containing polyacrylic acid copolymers. The use of sulphonated polyester resins is described in Russian Patent Specification 861,377 and that of derivatives of styrene/maleic anhydride copolymers in Russian Patent Specification 903,438. The use of low molecular weight non-ionic surfactants is described in Belgian Patent Specification 741,374.

The activity of known dispersants, however, is not sufficient in many cases to obtain dispersions having optimum rheological properties. If the viscosity of such dispersions is too high, the solids content must be reduced in order to obtain industrially utilizable dispersions, for example coating compounds. This has, however, a deterioration of the quality of this coating compound as a consequence, in particular with respect to its colour strength, covering power and/or film formation.

There is thus still a need for aqueous dispersions of fillers and/or pigments having improved properties. Aqueous dispersions of fillers and/or pigments have now been which are characterized in that they contain a dispersant combination of the following composition:

A) 40 to 95% by weight of a water-soluble polymer,
B) 0 to 60% by weight of a non-ionic alkylene oxide adduct having an average molecular weight of 200 to 100,000,
C) 0 to 60% by weight of compounds of the formulae (I), (II) and/or (III)

in which
$R_1$ represents an optionally substituted aliphatic, aromatic or araliphatic radical having 1 to 50 C atoms,
z in each case independently of one another represents an integer from 1 to 10 and
x represents hydrogen, a monovalent metal ion or an optionally substituted ammonium ion and
D) 0 to 60% by weight of a compound of the formula (IV)

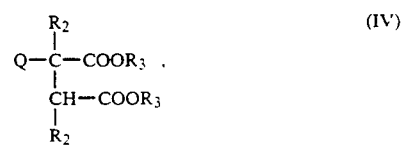

in which
Q represents hydrogen,

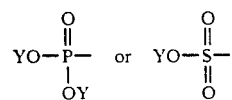

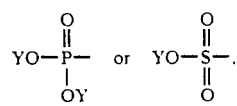

in which
Y in each case independently of one another represents hydrogen, a monovalent metal ion or an optionally substituted ammonium ion,
$R_2$ in each case independently of one another represents hydrogen, an optionally substituted alkyl radical having 1 to 12 C atoms or a radical of the type —CH$_2$—COOR$_3$ or —CH$_2$—CH$_2$—COOR$_3$ and
$R_3$ in each case independently of one another represents hydrogen, Y or an optionally substituted alkyl radical having 1 to 25 C atoms,
where the sum A) +B) +C) +D) gives 100% by weight and at least one of the components B), C) and D) is different from zero.

Component A) is preferably present in up to 50 to 90, in particular 60 to 80% by weight. Component B) is preferably present in up to 10 to 40, in particular 20 to 30% by weight. Components C) and D) are preferably present independently of one another in each case up to 0 to 40, in particular 10 to 30% by weight.

Possible water-soluble polymers Component A)) are, for example, any water-soluble homopolymers and copolymers which may also be optionally modified natural products (for example salts with monovalent cations). Those which are suitable are, for example, cellulose derivatives such as carboxymethylcellulose, sulphonated polyesters and hydrolysates of polyacrylonitrile. Homopolymers and copolymers of methacrylic and/or acrylic acid and their salts are preferred, in particular those having molecular weights in the range from 800 to 40,000, especially 1,000 to 20,000, in the form of the sodium, potassium or optionally substituted ammonium salts.

Possible non-ionic alkylene oxide adducts (=Component B)) are mono-, di- and polyfunctional species. For example, they may be reaction products of alkylene oxides with any compounds containing active hydrogen. The alkylene oxides can contain, for example, 2 to 40, preferably 2 or 3, C atoms. The compounds containing active hydrogen may be, for example, mono-, di- or polyfunctional, optionally substituted phenols, alcohols, thioalcohols or amines. Reaction products of alkylene oxides with a,w-aminopolyethers are also suitable, for example those having an average molecular weight of 200 to 100,000, preferably from 400 to 60,000.

A particular group of compounds which are suitable as Component B) correspond to the formula (V)

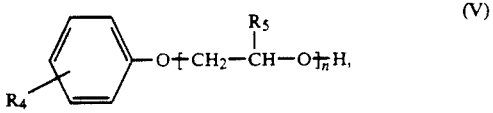

in which $R_4$ denotes an optionally substituted aliphatic, aromatic or araliphatic radical having 1 to 40 carbon atoms, $R_5$ denotes hydrogen, phenyl or an alkyl radical having 1 to 12 C atoms and n denotes a number from 2 to 300.

n preferably denotes 4 to 100.

A further particular group of compounds which are suitable as Components B) correspond to the formula (VI)

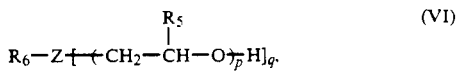

in which $R_5$ has the meaning indicated in formula (V)

$R_6$ represents an optionally substituted aliphatic radical having 2 to 12 C atoms, z denotes oxygen, sulphur or nitrogen and p denotes a number from 2 to 300 and q represents 1, if Z represents oxygen or sulphur and q represents 2, if Z represents nitrogen. p preferably denotes a number in the range 4 to 100.

A third particular group of compounds which are suitable as Component B) are addition compounds of ethylene oxide and/or propylene oxide to polyamine and/or polyhydroxyl compounds having an average molecular weight in the range from 42 to 100,000, preferably having an average molecular weight from 150 to 40,000.

Possible sulphone group-containing compounds (=Component C), formula (I)) are, for example, aliphatic, aromatic and araliphatic, optionally substituted sulphonic acids and their salts, in particular alkylbenzenesulphonic acids, naphthalenesulphonic acids, condensed naphthalenesulphonic acids, sulphonated oligomers and polymers (for example of styrene), reaction products of sulphanilic acid with polymers (for example with maleic anhydride copolymers), sulphosuccinic acid and sulphosuccinic acid esters.

Possible sulphate and phosphate group-containing compounds (=Component C), formulae (II) and (III)) are, for example, reaction products of thionyl chloride or phosphonyl chloride with alcohols (for example dodecyl sulphate). Sulphates and phosphates of the non-ionic alkylene oxide adducts described above are preferred.

A particular group of compounds which are suitable as component D) are those of the formula (VII)

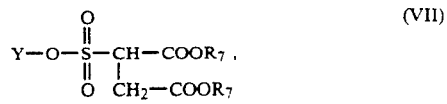

in which y has the meaning indicated in formula (IV) and $R_7$ independently of one another in each case represents an optionally substituted alkyl radical having 1 to 25 C atoms, hydrogen, a monovalent metal ion or an optionally substituted ammonium ion.

$R_7$ preferably represents an optionally substituted alkyl radical having 8 to 22 C atoms.

Another group of compounds which are suitable as Component D) are, for example, those of the formula (VIII)

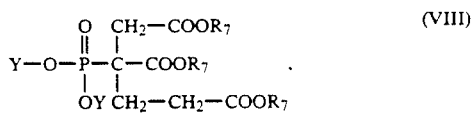

in which $R_7$ has the meaning indicated in formula (VII) and

Y has the meaning indicated in formula (IV).

$R_7$ in formula (VIII) preferably represents hydrogen, a monovalent metal ion or an optionally substituted ammonium ion.

Aqueous dispersions according to the invention may, for example, contain the dispersant combination in amounts from 0.02 to 10% by weight (relative to the solids present in the dispersion). Preferably, this amount is in the range 0.05 to 5% by weight, particularly preferably in the range 0.1 to 1% by weight.

The dispersions according to the invention, containing a number of dispersants, are characterized by improved flow properties, in particular in comparison to dispersions which only contain a single dispersant. This means that the additive combination according to the invention shows a surprising synergistic effect.

The choice of Components B), C) and/or D) can be carried out by methods known per se, for example based on viscosity measurements on dispersions. Combinations of Components A) +B) +C) or D) are particularly preferred. The ratio of components A) to D) to one another may vary with different filler and/or pigment compositions. The activity of dispersant combinations according to the invention can, if desired, be optimized by varying the proportions of the individual components to one another in order thus to obtain dispersions with the best possible flow properties. The optimum ratio of the components in each case can be determined in a simple manner by a few screening tests (see Examples).

Possible fillers and pigments are any organic or inorganic solids, for example calcium carbonate, silicates (such as talc, kaolin or mica), silica, glass beads, aluminium titanate, silicon carbide, silicon nitride, other powders for ceramic production, zinc oxide, titanium dioxide, iron oxides, organic pigments (such as γ-quinacridone or Cu phthalocyanine), metal oxides, metal powders, metal fibres, alumina, Al(OH)$_3$, carbon black, graphite coal, ground minerals, molybdenum sulphide and calcium sulphate. Dispersions according to the invention may, for example, contain 5 to 95% by weight of solids. Preferably, the solids content is between 15 and 80% by weight, particularly preferably between 30 and 70% by weight.

The preparation of dispersions according to the invention may be carried out in a manner known per se. For example, the dispersant combination selected by preliminary tests may be dissolved in water and the substances to be dispersed may then be added with stirring. The dispersant combination, water and the solids may also be mixed and ground together in a mill. Preferably, the solids are first predispersed with the dispersant Component A) and then the other dispersant components and, if desired, further water are added. Dispersions having particularly strongly improved flow properties are in general thus obtained.

The pH of the dispersions according to the invention may influence the flow properties. If desired, the optimum pH in each case may be determined by simple optimization experiments. It is in general in the range between pH 5 and pH 10.

Dispersions according to the invention can, if desired, contain further customary additives, for example binders, colourants and/or antifoams.

The evaluation of the dispersions according to the invention, in particular their flow properties, may be carried out, for example, by viscosity measurements. Screening tests are advantageously carried out using highly concentrated dispersions, as they are used in practice. As shown in the examples, this has the advantage that the differences in the activity of individual dispersants or dispersant combinations remain relatively the same but, absolutely, higher values can be measured.

The following examples illustrate the present invention.

EXAMPLES

Example 1

First 106 g of water and then, with stirring and in the course of 15 min, 340 g of calcium carbonate (tamped density: 1.2 g/ml, average particle diameter: 3 μm), 20 g of talc (particle size: 81% under 10 μm) and 240 g of titanium dioxide (oil number: 19, brightening power: 750, relative scattering power: 112, density: 4.1) were added to a solution of 1.2 g (=0.2% by weight, relative to the solid) of a low molecular weight sodium polyacrylate, having an average molecular weight of about 3,500, in 1.8 g of water. The pH of the dispersion was kept constant at pH 8.6 using 10% strength NaOH solution. After stirring for 60 min, 1 g of water, 0.3 g of a nonylphenol/10 EO ethoxilate and 0.75 g of a 40% strength aqueous solution of a compound of the formula (VIII) with all $R_7$ and all Y=sodium were added successively. The dispersion obtained was stirred further and its viscosity was measured after 10 min and after 24 hours using a Haake RV 100 viscometer, MV P II measuring head. At 23° C. and 440 $S^{-1}$, a viscosity of 460 mPa.s was measured after 10 min and a viscosity of 410 mPa.s after 24 hours.

Comparison Example A

The procedure was analogous to Example 1, but now 4.5 g of the sodium polyacrylate solution (=0.3% by weight relative to solid, solid/solid) instead of 3.0 g and no nonylphenol/10 EO ethoxylate and no compound of the formula (VIII) were employed as dispersant. The viscosity of the dispersion was 590 mPa.s after 10 min at 23° C., and 620 mPa.s after 24 hours. Using 3 g of the sodium polyacrylate solution (=0.2% by weight), a viscosity of 680 mPa.s was measured after 10 min and a viscosity of 650 mPa.s after 24 hours.

Example 2

The procedure was as described in Example 1, but only 0.6 g of nonylphenyl/10 Eo adduct were employed instead of the mixture nonylphenol/10 EO ethoxylate with the compound of the formula (VIII). At 23° C., a viscosity of 520 mPa.s was measured after 10 min and a viscosity of 570 mPa.s after 24 hours.

Example 3

The procedure was as described in Example 2, but 1.5 g of a 40% strength solution of a compound of the formula (VIII) with all $R_7$=all Y=sodium were added instead of the nonylphenol/10 EO adduct. After 10 min, a viscosity of 530 mPa.s was measured and after 24 hours a viscosity of 480 mPa.s, in each case at 23° C.

Example 4

The procedure was as described in Example 1, but talc having a particle size of 98% under 10 μm was employed, a pH value of 8.8 was used and the proportion of nonylphenol/10 EO ethoxylate to compound of the formula (VIII) was varied. Table 1 shows the viscosity measurements on the dispersion, which were performed after 24 hours and at 23° C.

TABLE 1

| Weight ratio of nonylphenyl/10 EO ethoxilate to compound of the formula (VIII) | Measured viscosity (mPa · s) |
|---|---|
| a) 3:7 | 630 |
| b) 7:3 | 480 |
| c) 8:2 | 390 |

The amount of nonylphenol/10 EO ethoxilate + compound of the formula (VIII) was in all cases 0.1% by weight relative to solid, solid/solid.

Comparison Example B

The procedure was as described in Example 4, but only 3.0 g of the sodium polyacrylate solution (=0.2% by weight relative to solid, solid/solid) and no nonylphenol/10 EO ethoxylate and no compound of the formula (VIII) were employed. A viscosity of 780 mPa.s was measured at 23° C.

A corresponding experiment using 4.5 g of sodium polyacrylate solution (=0,3% by weight relative to solid, solid/solid) gave a dispersion having a viscosity of 770 mPa.s (at 23° C.) .

Example 5

The procedure was as described in Example 4 c), but all dispersant components were first mixed with water and only then were the solids added. A dispersion having a viscosity of 480 mPa.s was obtained (at 23° C).

Example 6 and Comparison Examples C and D

The procedure was as described in Example 4, but a pH of 8.6 was used and 240 g of titanium dioxide having an oil number of 20, a brightening power of 700, a relative scattering power of 105 and a density of 4.1 were employed. The viscosities of the dispersions obtained measured in each case at 23° C. after 24 hours can be seen from Table 2.

TABLE 2

| Example No. | Concentration of Na polyacrylate (% by wt.) | Weight ratio of nonylphenol/ EO ethoxylate to compound of the formula (VIII) | Measured viscosity (mPa · s) |
| --- | --- | --- | --- |
| 6a | 0.2 | 0:10 | 400 |
| 6b | 0.2 | 3:7 | 450 |
| 6c | 0.2 | 8:2 | 270 |
| 6d | 0.2 | 10:0 | 300 |
| Comp. Ex. C | 0.2 | — | 600 |
| Comp. Ex. D | 0.3 | — | 590 |

The amount of nonylphenol/10 EO ethoxylate+-compound of the formula (VIII) was in all cases 0.1% by weight relative to solid, solid/solid.

Example 7 and Comparison Examples E and F

The procedure was as described in Example 4, but 0.1% by weight of a mixture of nonylphenol/10 EO ethoxylate and a further additive were employed in the weight ratio 7:3 (solid/solid) additionally to 0.2% by weight of sodium polyacrylate having an average molecular weight of about 3,500. The viscosities measured in each case at 23° C. after 24 hours can be seen from Table 3.

TABLE 3

| Example No. | Further additive | Measured viscosity (mPa · s) |
| --- | --- | --- |
| 7a | Dodecyl sulphate | 590 |
| 7b | Condensed naphthalenesulphonate | 490 |
| 7c | Sodium sulphosuccinate | 520 |
| 7d | Sodium hexametaphosphate | 680 |
| 7e | Sulphated aralkylphenol ethoxylate | 530 |
| 7f | Phosphated aralkylphenol ethoxylate | 570 |
| 7g | Non-ionic surfactant (Type Borchigen ® DFN) | 620 |
| 7h | Aminopolyether/propylene oxide-ethylene oxide 70:30 adduct, molecular weight 21,500 | 650 |
| Comparison Example E | 0.2% by wt. of sodium polyacrylate, alone | 760 |
| Comparison Example F | 0.3% by wt. of sodium polyacrylate, alone | 770 |

Example 8

The procedure was as described in Example 1, but the products which can be seen from Table 4 were employed instead of nonylphenol/10 EO ethoxilate. In each case, the viscosities also indicated in Table 4 were measured at 23° C. after stirring for 24 hours.

TABLE 4

| Example No. | Additive | Measured viscosity (mPa · s) |
| --- | --- | --- |
| 8a | Polyethylene oxide/polypropylene block polymer, molecular weight 5,000 | 420 |
| 8b | Non-ionic surfactant (Type Borchigen ® DFN) | 440 |
| 8c | Aminopolyether/propylene oxide-ethylene oxide 70:30 adduct, molecular weight 21,500 | 440 |
| 8d | Non-ionic aralkylphenol ethoxylate, | 430 |

TABLE 4-continued

| Example No. | Additive | Measured viscosity (mPa · s) |
| --- | --- | --- |
| | average molecular weight 1,100 | |

Example 9 and Comparison Examples G and H

Analogously to the method described in Example 1, a dispersion of the following individual components was prepared at a pH of 9.0:
129 g of water,
251 g of dolomite (tamped density: 1.21 g/ml, tamped volume: 83 ml/100 g),
140 g of calcium carbonate (tamped density: 1.2 g/ml, average particle diameter: 3 µm),
48 g of barite (particle size: 99% under 20 µm) oil number: 11),
24 g of talc (particle size: 90% under 10 µm),
145 g of titanium dioxide (identical with the TiO₂ used in Example 1),
3.1 g of 40% strength sodium polyacrylate solution (average molecular weight 3,500) and
0.61 g of additive according to Table 5 (relative to solid/solid).

The viscosity was in each case determined at 23° C. in the dispersions obtained after stirring for 24 hours. The result can also be seen from Table 5.

TABLE 5

| Example No. | Additive Nonylphenol/10 EO ethoxilate and compound of the formula (VIII) in the weight ratio | Measured viscosity (mPa · s) |
| --- | --- | --- |
| 9a | 3:7 | 420 |
| 9b | 5:5 | 390 |
| 9c | 6:4 | 320 |
| 9d | 8:2 | 400 |
| Comparison Example G | 0.2% by wt. of sodium polyacrylate. alone | 470 |
| Comparison Example H | 0.3% by wt. of sodium polyacrylate. alone | 480 |

Example 10 and Comparison Examples I and J

Analogously to the method described in Example 1, a dispersion with the pH resulting without addition of NaOH solution was prepared from
205.4 g of chromic oxide pigment,
17.7 g of water,
1.0 g of 40% strength sodium polyacrylate solution (analogous to Example 1)
0.23 g of compound of the formula (VIII) (analogous to Example 1)
0.01 g of nonylphenol/10 EO ethoxilate.
The viscosity obtained in the dispersion obtained after stirring for 14 hours can be seen from Table 6.

TABLE 6

| Example No. | Additive | Measured viscosity at 23° C. (mPa · s) |
| --- | --- | --- |
| 10 | as indicated above | 330 |
| Comparison Example I | 2.5 g of sodium polyacrylate (40% strength) | 420 |
| Comparison Example J | 3.75 g of sodium polyacrylate (40% strength) | 400 |

What is claimed is:

1. Aqueous dispersions of fillers and/or pigments, which contain a synergistic dispersant combination of the following compositions:

A) 50 to 80% by weight of a water-soluble polymer selected from the group consisting of cellulose derivatives, sulphonated polyesters and hydrolysates of polyacrylonitrile, including carboxymethylcellulose, homopolymers and copolymers of methacrylic and/or acrylic acid and their salts with molecular weights in the range from 800 to 40,000, B) 10 to 40% by weight of a non-ionic alkylene oxide adduct of the formula

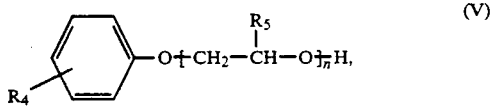

in which $R_4$ denotes an optionally stubstituted aliphatic, aromatic or araliphatic radical having 1 to 40 carbon atoms, $R_5$ denotes hydrogen, phenyl or alkyl radical having 1 to 12 C atoms and n denotes a number from 2 to 300.

n preferably denotes 4 to 100, and

D) 10 to 30% by weight of a compound of the formula

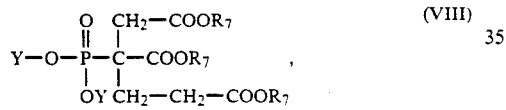

in which $R^7$ is hydrogen, a monovalent metal ion or an optionally substituted ammonium ion and Y is hydrogen, a monovalent metal ion or an optionally substituted ammonium ion, where the sum A) +B) +D) gives 100% by weight.

2. Dispersions of claim 1, in which the dispersion contains the dispersant combination in an amount from 0.02 to 10% by weight, relative to the solids present in the dispersion.

3. Dispersions of claim 1, which contain calcium carbonate, silicates, silica, glass beads, aluminium titanate, silicon carbide, silicon nitride, other powders for ceramic production, zinc oxide, titanium dioxide, iron oxides, organic pigments, metal oxides, metal powders, metal fibres, alumina, $Al(OH)_3$, carbon black, graphite, coal, ground minerals, monybdenum sulphide and/or calcium sulphate.

4. Dispersions of claim 1, which contain 5 to 95% by weight of solids.

5. Dispersions of claim 1, which contain further customary additives.

6. Dispersions of claim 1, in which the dispersion contains a dispersant combination, wherein the component (A) is sodium polyacrylate.

7. Dispersions of claim 1, in which the dispersion contains a dispersant combination, wherein the component (B) is the reaction product of nonylphenol with -ethylenoxide groups.

8. Dispersions of claim 1, in which the dispersion contains a dispersant combination, wherein the component (D) is the tetra-sodium salt of 2-phosphonobutan-1,2,4-tricarboxylic acid of the formula

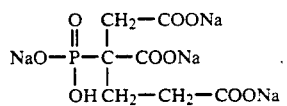

* * * * *